(12) United States Patent  
Kuhn et al.

(10) Patent No.: US 12,030,289 B2
(45) Date of Patent: Jul. 9, 2024

(54) MULTILAYER COMPOSITE COMPONENT

(71) Applicant: Wobben Properties GmbH, Aurich (DE)

(72) Inventors: Marvin Kuhn, Rastede (DE); Uwe Rahmann, Großefehn (DE); Christina Bärtl, Aurich (DE); Daniel Vinke, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/831,314

(22) Filed: Jun. 2, 2022

(65) Prior Publication Data

US 2023/0125200 A1 Apr. 27, 2023

Related U.S. Application Data

(60) Continuation of application No. 17/087,272, filed on Nov. 2, 2020, now abandoned, which is a division of (Continued)

(30) Foreign Application Priority Data

Oct. 22, 2015 (DE) ...................... 10 2015 220 672.6
Jul. 19, 2016 (DE) ...................... 10 2016 213 206.7

(51) Int. Cl.
*B32B 27/40* (2006.01)
*B29D 99/00* (2010.01)
(Continued)

(52) U.S. Cl.
CPC .......... *B32B 27/40* (2013.01); *B29D 99/0025* (2013.01); *B32B 5/02* (2013.01);
(Continued)

(58) Field of Classification Search
None
See application file for complete search history.

(56) References Cited

U.S. PATENT DOCUMENTS 7,794,209 B2 9/2010 Wobben
7,946,803 B2 5/2011 Wobben
(Continued)

FOREIGN PATENT DOCUMENTS

DE 10319246 A1 12/2004
DE 10344379 A1 4/2005
(Continued)

OTHER PUBLICATIONS

Williams—surface-modified UHMWPE powders and fibers in tough—Poly.Eng.Sci—1991 (Year: 1991).*

(Continued)

*Primary Examiner* — John Vincent Lawler
(74) *Attorney, Agent, or Firm* — Seed IP Law Group LLP

(57) ABSTRACT

A method of forming a composite component comprising a layer which consists at least partly of polyethylene, a layer which consists at least partly of a polyurethane and/or an elastomer, at least one layer which consists at least partly of a plastic reinforced by fibers, or which consists at least partly of an adhesive, wherein the layer is disposed directly between the layer and the layer, wherein the layers have been joined in a first operation to form a laminate composite and the layer have been joined in a second operation onto the laminate composite comprising the layers.

10 Claims, 3 Drawing Sheets

Related U.S. Application Data application No. 15/769,978, filed as application No. PCT/EP2016/075448 on Oct. 21, 2016, now abandoned.

(51) Int. Cl.

| | | |
|---|---|---|
| *B32B 5/02* | (2006.01) | |
| *B32B 25/08* | (2006.01) | |
| *B32B 25/10* | (2006.01) | |
| *B32B 25/14* | (2006.01) | |
| *B32B 27/12* | (2006.01) | |
| *B32B 27/30* | (2006.01) | |
| *B32B 27/32* | (2006.01) | |
| *B32B 27/38* | (2006.01) | |
| *B32B 37/02* | (2006.01) | |
| *B32B 37/12* | (2006.01) | |
| *B32B 38/18* | (2006.01) | |
| *F03D 1/06* | (2006.01) | |

(52) U.S. Cl.
CPC ............ *B32B 25/08* (2013.01); *B32B 25/10* (2013.01); *B32B 25/14* (2013.01); *B32B 27/12* (2013.01); *B32B 27/308* (2013.01); *B32B 27/32* (2013.01); *B32B 27/322* (2013.01); *B32B 27/38* (2013.01); *B32B 37/02* (2013.01); *B32B 37/12* (2013.01); *B32B 38/1866* (2013.01); *B32B 2260/021* (2013.01); *B32B 2260/046* (2013.01); *B32B 2262/0253* (2013.01); *B32B 2262/101* (2013.01); *B32B 2262/106* (2013.01); *B32B 2270/00* (2013.01); *B32B 2274/00* (2013.01); *B32B 2603/00* (2013.01); *F03D 1/0675* (2013.01); *F05B 2280/4003* (2013.01); *Y02E 10/72* (2013.01)

(56) References Cited

U.S. PATENT DOCUMENTS

| | | |
|---|---|---|
| 8,585,370 B2 | 11/2013 | Muschke et al. |
| 8,770,942 B2 | 7/2014 | Saitou et al. |
| 9,067,341 B2 | 6/2015 | Wehner |
| 2005/0266232 A1 | 12/2005 | Wang et al. |
| 2007/0117947 A1 | 5/2007 | Wehner |
| 2007/0231156 A1 | 10/2007 | Hong |
| 2008/0268258 A1 | 10/2008 | Verma et al. |
| 2009/0039200 A1 | 2/2009 | Marx et al. |
| 2010/0043227 A1* | 2/2010 | Numajiri ............... B66C 1/108 29/889 |
| 2012/0034833 A1* | 2/2012 | Schaube ............... B29C 70/086 428/447 |
| 2012/0087801 A1* | 4/2012 | Driver ................... B29C 70/34 156/182 |
| 2012/0093659 A1 | 4/2012 | Muschke et al. |
| 2012/0156049 A1 | 6/2012 | Hong |
| 2012/0159785 A1* | 6/2012 | Pyles .................... B33Y 80/00 29/889.7 |
| 2013/0045105 A1 | 2/2013 | Driver et al. |
| 2013/0101426 A1 | 4/2013 | Saitou et al. |
| 2014/0295187 A1* | 10/2014 | Jacobsen ............... F03D 1/0675 428/413 |
| 2015/0174885 A1 | 6/2015 | Khan |
| 2015/0198141 A1* | 7/2015 | Hayden ................. F03D 1/0675 416/212 R |
| 2016/0208773 A1* | 7/2016 | Theile .................... B32B 25/10 |
| 2016/0215757 A1* | 7/2016 | Behmer ................. B29C 70/086 |
| 2016/0288457 A1* | 10/2016 | Ellis ....................... B32B 25/10 |

FOREIGN PATENT DOCUMENTS

| | | | |
|---|---|---|---|
| DE | 102004007487 A1 | 9/2005 | |
| DE | 202009006966 U1 | 9/2010 | |
| DE | 102009002501 A1 | 10/2010 | |
| DE | 102013217128 A1 | 3/2015 | |
| EP | 2497943 A1 | 9/2012 | |
| EP | 2583823 A1 * | 4/2013 | ............ B32B 25/08 |
| EP | 2724855 A1 | 4/2014 | |
| EP | 2886334 A1 | 6/2015 | |
| EP | 2927482 A1 | 10/2015 | |
| WO | WO 2004076852 A2 | 9/2004 | |
| WO | WO 2006122749 A1 | 11/2006 | |
| WO | WO 2010118860 A2 | 10/2010 | |
| WO | WO 2013045087 A1 | 4/2013 | |
| WO | WO-2013045087 A1 * | 4/2013 | ........... B29C 70/086 |
| WO | WO 2013045114 A2 | 4/2013 | |
| WO | WO 2014170232 A1 | 10/2014 | |
| WO | WO 2015015202 A1 | 2/2015 | |
| WO | WO 2015028250 A1 | 3/2015 | |
| WO | WO 2016075619 A1 | 5/2016 | |

OTHER PUBLICATIONS

Bouwmeester—carbon-dyneema hybrids—2008 (Year: 2008).*
Vlasblom—applications for UHMW-PE fibers—2009 (Year: 2009).*
Vielsack—WO 2013-045087 A1—IDS—MT—plastic+fibers-elastomer-UHME-PE outer—2013 (Year: 2013).*
International Standard ISO 813, Third edition, "Rubber, vulcanized or thermoplastic—Determination of adhesion to a rigid substrate—90° peel method," Feb. 15, 1997. (15 pages; with partial English translation).
Declaration for submission to the European Patent Office, Schleuter, *Gummiwerk Kraiburg GmbH & Co. KG*, 2021. (22 pages) (with machine translation).
Hanselmann (ed.) et al., "epoxy resins," *RÖMPP Thieme*, Aug. 26, 2021, https://roempp.thieme.de/lexicon/RD-05-01423?searchterm=epoxid&context=search. (12 pages) (with machine translation).
Cambridge Grammar, "Finally, at last, lastly or in the end?", *English Grammar Today*, downloaded Jan. 11, 2023. (2 pages).
Online Synonym Dictionary, "Synonym—synonymy," *Synonyms, Similar Words & Meanings*, downloaded Jan. 11, 2023. (1 page).
Bouwmeester et al., "Carbon/Dyneema® Intralaminar Hybrids: New Strategy to Increase Impact Resistance or Decrease Mass of Carbon Fiber Composites", *26th International Congress of the Aeronautical Sciences*, 2008 (6 pages).
Vlasblom et al., "The manufacture, properties and applications of high strength, high modulus polyethylene fibers", *Handbook of tensile properties of textile and technical fibres*, 2009. (51 pages).
"3M Wind Blade Protection Coating W4600 Kit (10X250ML) Safety Data Sheet", *3M United Kingdom PLC*, Dec. 4, 2012, 27 pages.
LeGault, "Wind blades: Progress and challenges", Composites World, Oct. 1, 2013, URL=https://www.compositesworld.com/articles/wind-blades-progress-and-challenges, download date Sep. 16, 2021, 6 pages.
"Ethylene-propylene rubber, ethylene-propylene-diene rubber", Material Archiv, Nov. 13, 2013, materialarchiv.ch/detail/30, 7 pages. (with machine English translation).
ISO, "Rubber, vulcanized or thermoplastic—Determination of indentation hardness—Part 1: Durometer method (Shore hardness)", International Standard 7619-1, Second Edition, Oct. 1, 2010, 18 pages.
Mishnaevsky et al., "Materials for Wind Turbine Blades: An Overview", *Materials* 10(11), 2017 (25 pages).
Standard DNVGL-ST-0376, "Rotor blades for wind turbines", Dec. 2015 (107 pages).
European Office Action, dated Dec. 15, 2022, for European Application No. 16 784 914.0-1107, 52 pages. (with machine English translation).

\* cited by examiner

A-A

MULTILAYER COMPOSITE COMPONENT

BACKGROUND

Technical Field

The present invention relates to a composite component, to the use of a composite component of the invention, to a wind turbine for a wind power installation, and to a method for producing a composite component.

Description of the Related Art

Rotor blades for wind power installations have been known for some considerable time and are described for example in DE 10 2004 007 487 A1 and DE 10 319 246 A1. In their operation they are subject to high loads as a result of wind pressure, erosion, temperature fluctuations, UV radiation and also by precipitation. Particularly at locations with a tropical climate, distinguished by highly changeable weathering effects and a high atmospheric humidity, such as in Brazil or Taiwan, for example, but also in Germany, rotor blades tend to suffer erosion.

At blade tip velocities of up to 300 km/h, grains of sand, salt particles, raindrops, insects or other airborne objects act abrasively. Particularly in the leading edge region, the surface of rotor blades is heavily loaded as a result, and at these points there is erosion of the rotor surface and therefore a loss of aerodynamics and stability. In order to reduce the blade tip erosion and the associated cost and labor for maintenance and repair, it is possible to limit the maximum speed of the installation, which results, however, in a reduced power. It therefore makes sense to improve the erosion resistance of rotor blades.

At the same time, however, the rotor blades are to be extremely lightweight, in order to minimize the bending loads acting on any rotor blade hub present and also on the associated bearings and the tower of the wind power installation.

Rotor blades and rotor blade elements are customarily produced in a molding process in which fiber materials and/or core materials, especially balsa wood, are inserted into a rotor blade element mold and are treated with a hardening resin so as to form a potentially load-bearing composite material. In the production of rotor blades or rotor blade elements, epoxy resins are frequently employed as resin. They are highly suitable for the construction of the base of a rotor blade or rotor blade element from fiber material and resin.

To protect the rotor blades or the rotor blade elements against effects of weathering and more particularly against erosion, attempts have been made to use a surface layer with a gelcoat process, as described in DE 10 344 379 A1. A disadvantage in this case is that with a process of that kind it is necessary to wait for a minimum working time until the gelcoat mixture has reacted to an extent such that it can be covered with fiber material. This wait results in unwanted slowing of the process for producing a rotor blade or rotor blade element. In the case of the gelcoat process, moreover, it is not possible to interrupt the production of a rotor blade element or rotor blade at any arbitrary point in order to allow bonding between the gelcoat surface layer and the infusion resin.

Attempts have also been made to adhere surface foils onto the rotor blade or rotor blade element or to secure such foils otherwise on the rotor blade or rotor blade element subsequently and possibly in such a way that they can be released. For example, polyurethane foils are adhered to rotor blades. A further possibility from the prior art, according to DE 10 2009 002 501 A1, is to produce a crosslinked composite of surface foil and infusion resin. This process as well is possible with polyurethane foils in particular. Polyurethane possesses high abrasion resistance. It is desirable, however, to improve still further the abrasion resistance of rotor blades and rotor blade elements.

DE 10 2013 217 128 A1 describes a rotor blade element for a wind power installation that comprises a surface foil made of ultrahigh molecular weight polyethylene (UHMW-PE). UHMW-PE is notable for very good wear resistances and abrasion resistances even in the face of abrasive media. Its abrasion resistance is six times higher than that of polyurethane. In addition, UHMW-PE possesses excellent chemical resistance and also a low coefficient of friction, outstanding dimensional stability, and high impact strength even at low temperatures. However, UHMW-PE is very difficult to bond using conventional adhesives and in particular does not adhere to resins, such as epoxy resins, for example. In the process described in DE 10 2013 217 128 A1, therefore, the polyethylene foil is joined, by means of two rubber attachment layers, to an underlying base comprising a fiber material impregnated with curable resin. In the process described, a total of three curing or vulcanizing steps are needed in order to coat a rotor blade element.

The plastic composite component described in WO 2010/118860 consists of a thermosetting synthetic resin as outer layer, an elastomer layer, and a metal and/or plastic support layer. The layers are assembled in a single operation with heat treatment or under irradiation with UV light. Among other fields of application, WO 2010/118860 also describes the use of the plastic composite component in rotor blades of helicopters or wind turbines.

BRIEF SUMMARY

Provided is a component, more particularly a rotor blade, which is notable for very high wear resistance and abrasion resistance and at the same time requires little time and low temperatures in production.

In particular, provided is a composite component (10) characterized by the following layer construction:
 a) a layer (11) which consists at least partly of polyethylene,
 b) a layer (12) which consists at least partly of a polyurethane and/or an elastomer,
 c) at least one layer (13) which consists at least partly of a plastic reinforced by fibers (14), or which consists at least partly of an adhesive,
 wherein the layer (12) is disposed directly between the layer (11) and the layer (13),
 wherein the layers (11) and (12) have been joined in a first operation to form a laminate composite and the layer (13) have been joined in a second operation onto the laminate composite comprising the layers (11) and (12).

In connection with the layer (12), the wording that the layer "consists" at least partly of a "polyurethane and an elastomer" or "includes at least" means that the material referred to is also a polyurethane elastomer. The wording "polyurethane or elastomer" means that either a nonelastomeric polyurethane or an elastomer is meant that is not a urethane elastomer. A preferred polyurethane in the present context is a thermoplastic polyurethane.

An advantageous feature of the design is that the laminate composite comprising the layers (11) and (12) is already fully cured and need not also be cured further by exposure to heat. In the design, therefore, the temperature needed for assembling can be kept lower than would be the case if the polyurethane layer (12) or the elastomer layer (12) likewise required curing. As a result, the significant advantage is achieved of simplification and acceleration of the assembly. In comparison to a layer construction in which the polyurethane layer (12) or the elastomer layer (12) is cured simultaneously with the layer (13) and where equal temperatures are employed for both curing procedures, the adhesion of the individual layers is increased.

Without wishing to be tied to a specific theory, it was recognized in our own investigations that there is an ideal temperature range for the curing of individual layers. If the temperatures are high than required, this may have an adverse influence on the resulting layer, since unwanted secondary reactions hinder the polymerization reaction that takes place in the course of curing. At temperatures that are too high, moreover, there may also be unwanted crosslinking reactions, influencing the properties of the resultant layer. At temperatures which are much too high, there may even be embrittlement or decomposition of the layer. At temperatures that are too low, the curing or polymerization of the layer proceeds incompletely or not at all. Where both layers are cured simultaneously, at least one of the layers will necessarily not be cured in the temperature range that is ideal for that layer. If two layers are to be cured simultaneously and a first layer cures at low temperatures whereas the second layer cures at higher temperatures, the practice to date has been to carry out curing at the higher temperature, since lack of curing, or incomplete curing, of the second layers to be cured is to be avoided. In this case it has been accepted that the first layer will receive too great a thermal stress and that the excessively high temperature can have a negative impact on the polymerization and the resultant layer.

Correspondingly it has been recognized that the individual layers of the composite component (10), and therefore the composite component (10) as a whole, has better properties if the layers (11) and (12) have been joined in a first operation to form a laminate composite and the layer (13) have been joined in a second operation onto the laminate composite comprising the layers (11) and (12). Surprisingly it has emerged that by this means not only the properties of the individual layers but also the adhesion of the individual layers to one another is increased.

In one preferred embodiment, the polyethylene is a high molecular weight polyethylene (HMW-PE), an ultrahigh molecular weight polyethylene (UHMW-PE) or polytetrafluoroethylene (PTFE), preferably an ultrahigh molecular weight polyethylene (UHMW-PE).

The ultrahigh molecular weight polyethylene (UHMW-PE), in particular, is distinguished by very good wear resistances and abrasion resistances even in the face of abrasive media. In our own investigations it has emerged that through the use of a layer (11) which consists at least partly of UHMW-PE, in the composite component, it is possible to improve significantly the wear resistance and abrasion resistance of the composite component, more particularly of rotor blades.

A high molecular weight polyethylene (HMW-PE) for the purposes of the present invention is a high molecular weight polyethylene having an average molar mass of 500 to 1000 kg/mol. An ultrahigh molecular weight polyethylene (UHMW-PE) in the context of the present invention is an ultrahigh molecular weight polyethylene having an average molar mass of more than 1000 kg/mol. In the context of the present invention, it is preferred if the UHMW-PE used has an average molar mass of between 1000 kg/mol to 10 000 kg/mol, more preferably an average molar mass of between 1000 kg/mol and 5000 kg/mol, especially preferably between 3000 kg/mol and 5000 kg/mol. The average molar mass is determined arithmetically by the Margolies equation. The polyethylene used may be a linear or a crosslinked polyethylene.

The ultrahigh molecular weight polyethylene used preferably has a density of 0.93 to 0.94 g/cm$^3$.

In one preferred embodiment, the layer (11) further comprises a UV stabilizer which protects the polyethylene against aging caused by ultraviolet light. Preferred UV stabilizers are organic and inorganic UV absorbers, selected more particularly from the list encompassing benzophenones, benzotriazoles, oxalanilides, phenyltriazines, carbon black, titanium dioxide, iron oxide pigments, and zinc oxide, or 2,2,6,6-tetramethylpiperidine derivatives such as bis(2,2, 6,6-tetramethyl-4-piperidyl) sebacate ("hindered amine light stabilizer (HALS)").

Through the presence of a UV stabilizer it is possible to increase the long-term stability toward UV light.

It is particularly preferred if the layer (11) which consists at least partly of polyethylene consists predominantly of polyethylene, more particularly consists of polyethylene to an extent of more than 50 wt %, preferably more than 80 wt %, more preferably more than 95 wt %, more particularly of ultrahigh molecular weight polyethylene (UHMW-PE), based on the total weight of the layer.

A polyurethane in the context of this invention is a polyaddition product of at least dialcohols (diols) and/or polyols (e.g., long-chain diols) with polyisocyanates with formation of urethane groups (—NH—CO—O—).

It is preferred that the elastomer is an ethylene-propylene rubber (EPM), ethylene-propylene-diene rubber (EPDM), ethylene-acrylate rubber (EAM), fluorocarbon rubber (FKM), acrylate rubber (ACM) or acrylonitrile-butadiene rubber (NBR), preferably an ethylene-propylene-diene rubber (EPDM).

In our own investigations it has emerged that polyurethanes and elastomers (especially those which are preferred) produce particularly effective bonding between the layer (11), which consists at least partly of polyethylene, and the layer (13). In this context it has surprisingly emerged that polyurethane and also ethylene-propylene-diene rubber (EPDM) have particularly good adhesion properties when the polyethylene of the layer (11) is ultrahigh molecular polyethylene (UHMW-PE) and when the layer (13) is a at least partly of a plastic reinforced by fibers (14).

In one preferred embodiment of the present invention, the polyurethane is a thermoplastic polyurethane.

A thermoplastic polyurethane in the context of this invention is a polyurethane which within a particular temperature range can be (thermoplastically) reversibly deformed. Thermoplastic polyurethanes are to be distinguished in particular from thermoset polyurethanes, which after they have cured can no longer be thermoplastically deformed.

In one preferred embodiment of the present invention, the polyurethane is a polyurethane elastomer.

A polyurethane elastomer in the context of this invention is a polyurethane which is elastically deformable and preferably have a glass transition temperature (Tg) (determined by differential scanning calorimetry (DSC) with a heating rate of 10 K/m in) of at most 20° C.

It is preferred if the polyurethane elastomer has a glass transition temperature $T_g$ of between −5° C. and −45° C. (determined by differential scanning calorimetry (DSC) with a heating rate of 10 K/min).

It is preferred if the polyurethane elastomer has a Shore A hardness as per DIN ISO 7619-1 of at most 95, preferably of at most 85, more preferably of at most 75.

It is preferred if the polyurethane elastomer has a Shore A hardness as per DIN ISO 7619-1 of more than 40, preferably of more than 50, more preferably of more than 60.

It is preferred if the polyurethane elastomer has a Shore A hardness as per DIN ISO 7619-1 in the range from 40 to 95, preferably in the range from 50 to 85, more preferably in the range from 60 to 75.

Surprisingly it has emerged that thermoplastic polyurethane elastomers having the above-designated Shore A hardness values or ranges (according to DIN ISO 7619-1) have particularly good properties in the context of the use of the plastic composite component in rotor blades of helicopters or wind turbines.

It is preferred if the thermoplastic polyurethane is a condensation product of a polyol (long-chain diol) (preferably a polyester diol or polyether diol), a diisocyanate, and a short-chain diol. In the context of this invention, a short-chain diol is a diol having a molecular weight of below 500 g/mol, and a long-chain diol is a diol having a molecular weight of 500 g/mol or more, preferably up to 8000 g/mol.

Surprisingly it has emerged that the combination of polyurethane (preferably thermoplastic polyurethane and/or polyurethane elastomer) in the layer (12) and ultrahigh molecular weight polyethylene (UHMW-PE) in the layer (11) is distinguished by particularly good erosion properties. The polyurethane elastomer layer (12) acts to promote adhesion, while the outer UHMW-PE layer (11) is very resistant to erosion. This combination of polyurethane (preferably thermoplastic polyurethane and/or polyurethane elastomer) in the layer (12) and ultrahigh molecular weight polyethylene (UHMW-PE) in the layer (11) combines excellent adhesion to plastics reinforced at least partly by fibers (14) with wear resistances and abrasion resistances that were hitherto unachievable with other combinations of polymers and polyethylenes. It has emerged that the combination of polyurethane (preferably thermoplastic polyurethane and/or polyurethane elastomer) in the layer (12) and ultrahigh molecular weight polyethylene (UHMW-PE) in the layer (11) exhibits a synergistic effect, since the combined positive effect of the individual layers is increased.

Surprisingly it has also emerged that the combination of ethylene-propylene-diene rubber (EPDM) in the layer (12) and ultrahigh molecular weight polyethylene (UHMW-PE) in the layer (11) is likewise distinguished by particularly good erosion properties. This combination of ethylene-propylene-diene rubber (EPDM) in the layer (12) and ultrahigh molecular weight polyethylene (UHMW-PE) in the layer (11) combines excellent adhesion to plastics reinforced at least partly by fibers (14) with wear resistances and abrasion resistances that were hitherto unachievable with other combinations of elastomers and polyethylenes. It has emerged that the combination of ethylene-propylene-diene rubber (EPDM) in the layer (12) and ultrahigh molecular weight polyethylene (UHMW-PE) in the layer (11) exhibits a synergistic effect, since the combined positive effect of the individual layers is increased.

The layer (12) is disposed directly between the layer (11) and the layer (13) and there are no further (polymer) layers between the layer (11) and the layer (13). As a result of this construction it is possible—besides further advantages—to minimize the number of boundary layers, and the adhesion of the layers is improved. In cross section, composite components of the invention with only one layer (12) can be distinguished from other composite components which include a plurality of (polymer) layers. Composite components of the invention are likewise distinguishable from noninventive components wherein there has not first been joining of a laminate composite from the layers (11) and (12) and, in a further, second operation, joining of the layer (13) in a to the laminate composite comprising the layers (11) and (12). This is possible in particular by considering the boundary layers, especially the boundary layer between the layers (12) and (13).

It is particularly preferred if the layer (12) which consists at least partly of a polyurethane (preferably thermoplastic polyurethane and/or polyurethane elastomer) consists predominantly of polyurethane, more particularly consists of polyurethane to an extent of more than 50 wt %, preferably more than 80 wt %, more preferably more than 95 wt %, based on the total weight of the layer.

It is likewise particularly preferred if the layer (12) which consists at least partly of an elastomer consists predominantly of elastomer, more particularly consists of elastomer to an extent of more than 50 wt %, preferably more than 80 wt %, more preferably more than 95 wt %, more particularly of ethylene-propylene-diene rubber (EPDM), based on the total weight of the layer.

In one preferred embodiment, the layer (12) further comprises at least one additive selected from the group consisting of acrylates, methacrylates, epoxy resins, phenolic resins, novolacs, hexamethylenetetramine, hexamethoxymethylmelamine, and guanidines. These additives are particularly preferred if the elastomer of the layer (12) is an ethylene-propylene-diene rubber (EPDM). These additives are suitable for improving the strength of the layer (12) and/or for improving the adhesion of the layer (12) to the other layers.

According to one preferred embodiment, the plastic reinforced by fibers (14) is a plastic reinforced by UHMW-PE fibers (e.g., Dyneema fibers), a carbon fiber reinforced plastic (CRP) or a glass fiber reinforced plastic (GRP), preferably a glass fiber reinforced plastic (GRP).

Fiber reinforced plastics and especially glass fiber reinforced plastics (GRP) are distinguished by high mechanical and thermal stability in conjunction with a low specific weight and are therefore exceptionally suitable for the construction of the base of a rotor blade or rotor blade element.

Preferred is a composite component wherein the plastic reinforced by fibers (14) is a plastic resin system having an epoxy resin matrix, polyurethane resin matrix, polymethyl (meth)acrylate matrix, poly(meth)acrylate matrix or poly (meth)acrylamide matrix, and especially preferably is a plastic resin system having an epoxy resin matrix.

Preferred is a composite component wherein the plastic reinforced by fibers (14) is a plastic resin system having an epoxy resin matrix and the layer (13) further comprises at least one additive selected from the group consisting of acrylates, methacrylates, phenolic resins, and novolacs.

Likewise preferred is a composite component wherein the plastic reinforced by fibers (14) is a plastic resin system having an epoxy resin matrix which prior to curing takes the form of a multicomponent system and at least one component which comprises an amine curing agent further comprises at least one additive selected from the list consisting of hexamethylenetetramine, hexamethoxymethylmelamine, and guanidines.

It is preferred, furthermore, for the layer (11) and/or layer (12) independently of one another to have a thickness of 100 to 5000 μm, preferably a thickness of 300 to 900 μm, more preferably a thickness of 400 to 600 μm.

In our own investigations it has emerged that with these layer thicknesses there is a very good balance between wear resistances and abrasion resistances and the weight of the composite component. If the layer (11) is too thick, the weight of the composite component increases without substantial improvement in the wear resistance and abrasion resistance. With a layer (11) that is too thin, however, the wear resistance and abrasion resistance decreases.

In one embodiment it is preferred for the laminate composite comprising the layers (11) and (12) to have notches on the surface which in the second operation is joined to the layer (13). The notches increase the area of the surface and the adhesion of the layer (13) to the laminate composite after joining in the second operation is enhanced.

Following the assembling of the layers (11) and (12) in the first operation to form a laminate composite, in the case of polyurethane, the dialcohols (diols) and/or polyols (e.g., long-chain diols) have undergone reaction with the polyisocyanates to form the polyurethane, and the catalysts used for the reaction have been consumed by reaction or are inactive, insofar as the polycondensation has taken place with chemical catalysis. In the sense of the present invention it is preferred if the laminate composite comprising the layers (11) and (12) contains less than 0.5 pph (parts per hundred, i.e., fractions of the catalyst per hundred parts of polyurethane) of (active) catalyst, preferably less than 0.2 pph of (active) catalyst, and very preferably no (active) catalyst.

Following the assembling of the layers (11) and (12) in the first operation to form a laminate composite, in the case of an elastomer, this elastomer is fully crosslinked or vulcanized, and the crosslinkers used for the crosslinking or vulcanizing have been fully consumed by reaction, insofar as the crosslinking reaction has taken place with chemical induction. In the sense of the present invention it is preferred if the laminate composite comprising the layers (11) and (12) contains less than 0.5 pph (parts per hundred, i.e., fractions of the crosslinker per hundred parts of elastomer) of crosslinkers, preferably less than 0.2 pph of crosslinkers, and very preferably no crosslinkers.

In our own investigations it has proven advantageous if the assembling of the layer (13) to the laminate composite comprising the layers (11) and (12) takes place with curing of the layer (13). In practice, the plastic reinforced at least partly from a by fibers (14), after assembling with the laminate composite comprising the layers (11) and (12), is cured, for example by means of the addition of a curing agent shortly before the assembling, or by irradiating the plastic with light, insofar as the plastic is a photocuring plastic. In one preferred embodiment, the plastics matrix of the plastic reinforced by fibers (14) is produced shortly before the assembling by the mixing of a two-component mixture.

According to one preferred embodiment, the assembling of the layer (13) to the laminate composite comprising the layers (11) and (12) takes place with exposure to heat, preferably at temperatures of at least 20° C., preferably of at least 35° C., more preferably of at least 55° C., especially preferably of at least 75° C., insofar as the layer (12) comprises polyurethane.

According to one preferred embodiment, the assembling of the layer (13) to the laminate composite comprising the layers (11) and (12) takes place with exposure to heat, preferably at temperatures of at most 120° C., preferably of at most 110° C., more preferably of at most 95° C., especially preferably of at most 85° C., insofar as the layer (12) comprises polyurethane.

According to one particularly preferred embodiment, the assembling of the layer (13) to the laminate composite comprising the layers (11) and (12) takes place with exposure to heat, preferably at temperatures of 20 to 120° C., more preferably at temperatures of 35 to 110° C., more preferably at temperature of 55 to 95° C., and with very particular preference at temperatures of 75° C. to 85° C., insofar as the layer comprises polyurethane.

According to one alternative preferred embodiment, the assembling of the layer (13) to the laminate composite comprising the layers (11) and (12) takes place with exposure to heat, preferably at temperatures of 70 to 120° C., more preferably at temperatures of 80 to 115° C., and with very particular preference at temperatures of 105° C. to 115° C., insofar as the layer (12) comprises an elastomer.

According to one preferred embodiment, the composite component is designed such that the layer (13) consists at least partly of an adhesive and this adhesive is or comprises an epoxy resin adhesive or is or comprises a polyurethane adhesive. It is particularly preferred here for the adhesive containing layer (13) to join the laminate composite to a layer (15) consisting at least partly of a plastic reinforced by fibers.

In one preferred embodiment, the epoxy resin adhesive or the polyurethane adhesive is made thixotropic prior to curing. By this means it is possible for the adhesive prior to curing to fill gaps even with a thickness of several millimeters.

It is particularly preferred that the layer (15) is a fiber reinforced plastic (FRP), a plastic reinforced by UHMW-PE fibers (e.g. Dyneema fibers), a carbon fiber reinforced plastic (CRP), or a glass fiber reinforced plastic (GRP), preferably a glass fiber reinforced plastic (GRP).

It is preferred, furthermore, that the layer (15) is a plastic resin system having an epoxy resin matrix, polyurethane resin matrix, poly(meth)acrylate matrix, polymethyl (meth) acrylate matrix, or poly(meth)acrylamide matrix, especially preferably a plastic resin system having an epoxy resin matrix.

In the case of this embodiment it is preferred for the layer (13) to have a thickness of 1 to 5000 μm, preferably a thickness of 5 to 4000 μm, more preferably a thickness of 10 to 3000 μm.

In this embodiment it has proven advantageous and is therefore preferred if the assembling of the layer (13) to the laminate composite comprising the layers (11) and (12) takes place with curing of the adhesive containing layer (13) and if the layer (15) consisting of plastic reinforced by fibers is fully cured. In this embodiment it is possible to repair components, such as rotor blades of wind turbines, for example, which have eroded and/or exhibit damage, by adhering of the laminate composite comprising the layers (11) and (12), and, through outstanding wear resistances and abrasion resistances, of ultrahigh molecular polyethylene (UHMW-PE) in particular, to prevent future erosion and/or damage.

A further aspect of the present invention relates to a wind turbine comprising a composite component of the invention. It is particularly preferred here for this to be a wind turbine of a wind power installation and for the composite component to be disposed on at least one rotor blade element, more particularly on at least one rotor blade edge, preferably a leading rotor blade edge. It is particularly preferred that the composite component is disposed on all rotor blade edges, preferably on all leading rotor blade edges, of a wind power installation.

A further aspect in connection with the present invention relates to use of the plastic composite component of the invention in wind turbines, rotor blades of wind turbines, wings of aircraft or helicopters, airfoils of aircraft or helicopters, rotor blades of aircraft or helicopters, turbine blades of power units, bodywork components of vehicles, hull or keel region of watercraft, or effective surfaces of sports equipment. Use in accordance with the invention in rotor blade edges, preferably on leading rotor blade edges, of a wind power installation is particularly preferred.

The composite component of the invention may also, however, be employed in other sectors where surface erosion is to be avoided. In accordance with the invention such areas are, for example:
  wings, airfoils, rotor blades of aircraft or helicopters,
  turbine blades of power units,
  bodywork components of vehicles,
  hull or keel region of watercraft, or
  effective surfaces of sports equipment.

A further aspect in connection with the present invention relates to a method for producing a composite component of the invention, comprising the following steps:
  producing or providing a laminate composite comprising the layers (11) and (12),
  assembling the laminate composite, produced or provided, with the layer (13).

Preferred in accordance with the invention is a method wherein the polyurethane of the layer (12) is a thermoplastic polyurethane and/or a polyurethane elastomer and/or the elastomer of the layer (12) is an ethylene-propylene rubber (EPM), ethylene-propylene-diene rubber (EPDM), ethylene-acrylate rubber (EAM), fluorocarbon rubber (FKM), acrylate rubber (ACM) or acrylonitrile-butadiene rubber (NBR), preferably an ethylene-propylene-diene rubber (EPDM).

Likewise preferred is a method wherein the polyethylene of the layer (11) is a high molecular polyethylene (HMW-PE), an ultrahigh molecular polyethylene (UHMW-PE) or polytetrafluoroethylene (PTFE), preferably an ultrahigh molecular polyethylene (UHMW-PE).

Especially preferred is a method wherein the elastomer of the layer (12) is a polyurethane (preferably thermoplastic polyurethane and/or polyurethane elastomer) and the polyethylene of the layer (11) is ultrahigh molecular polyethylene (UHMW-PE).

Likewise especially preferred is a method wherein the elastomer of the layer (12) is an ethylene-propylene-diene rubber (EPDM) and the polyethylene of the layer (11) is ultrahigh molecular polyethylene (UHMW-PE).

In one preferred embodiment of the method of the invention, the plastic of the layer (13), reinforced by fibers (14), comprises plastic reinforced by UHMW-PE fibers (e.g., Dyneema fibers), a carbon fiber reinforced plastic (CRP), or a glass fiber reinforced plastic (GRP), preferably a glass fiber reinforced plastic (GRP).

Especially preferred is a method wherein the polyurethane of the layer (12) is a thermoplastic polyurethane and/or polyurethane elastomer and the polyethylene of the layer (11) is an ultrahigh molecular polyethylene (UHMW-PE), and the plastic of the layer (13), reinforced by fibers (14), is a glass fiber reinforced plastic (GRP).

Especially preferred is a method which comprises the following steps:
  producing or providing a laminate composite comprising the layers (11) and (12),
  assembling the laminate composite, produced or provided, with an uncured layer (13), and
  curing the layer (13).

Preferred is a method wherein the uncured layer (13) is an epoxy resin, preferably a two-component epoxy resin which is mixed up prior to the assembling with the laminate composite produced or provided.

Preferred is a method wherein, for producing a laminate composite comprising the layers (11) and (12), the layer (11) and/or layer (12) has been pretreated, preferably by one, two, three or more of the pretreatment methods selected from the group encompassing
  material-removing machining, especially grinding,
  chemical surface treatment,
  treatment with adhesion promoters (primers) and/or chemical strippers,
  thermal surface treatment, especially plasma activation, plasma surface treatment, and gas flame treatment,
  electrical surface treatment, especially corona treatment,
  surface cleaning, preferably by brushing, sanding and/or blasting,
  removal of residues of dust, grease and/or oil, and
wherein the pretreating of the layer (11) and/or layer (12) takes place preferably on that side of the layer which, on production of the laminate composite comprising the layers (11) and (12), is joined to the other respective layer (12) or (11).

Preferred is a method wherein the laminate composite comprising the layers (11) and (12), after being produced or provided, and before the assembling of the laminate composite, produced or provided, with an uncured layer (13), is pretreated, preferably by one, two, three or more of the pretreatment methods selected from the group encompassing
  material-removing machining, especially grinding,
  chemical surface treatment,
  treatment with adhesion promoters (primers) and/or chemical strippers,
  thermal surface treatment, especially plasma activation, plasma surface treatment, and gas flame treatment,
  electrical surface treatment, especially corona treatment,
  surface cleaning, preferably by brushing, sanding and/or blasting,
  removal of residues of dust, grease and/or oil, and
wherein the pretreating of the laminate composite comprising the layers (11) and (12) takes place preferably on the layer (12).

According to one preferred embodiment of the method of the invention, the assembling of the layer (13) to the laminate composite comprising the layers (11) and (12) takes place with exposure to heat, preferably at temperatures of at least 20° C., preferably of at least 35° C., more preferably of at least 55° C., especially preferably of at least 75° C.

According to one preferred embodiment of the method of the invention, the assembling of the layer (13) to the laminate composite comprising the layers (11) and (12) takes place with exposure to heat, preferably at temperatures of at most 120° C., preferably of at most 110° C., more preferably of at most 95° C., especially preferably of at most 85° C.

According to one preferred embodiment of the method of the invention, the assembling of the layer (13) to the laminate composite comprising the layers (11) and (12) takes place with exposure to heat, preferably at temperatures of 20 to 120° C., more preferably at temperatures of 35 to 110° C., more preferably at temperature of 55 to 95° C., and with very particular preference at temperatures of 75° C. to 85° C.

A further aspect in connection with the present invention relates to a composite component produced by a method of the invention.

A further aspect in connection with the present invention relates to a method for repairing and/or restoring a rotor blade element (in the sense of this specification, likewise a production method; see above), preferably a rotor blade element of a wind power installation with a composite component, comprising the following steps:
preparing the damaged rotor blade element,
producing or providing a laminate composite comprising the layers 11 and 12,
applying an uncured layer 13 to the prepared rotor blade element and/or to the laminate composite produced or provided and comprising the layers 11 and 12,
assembling the laminate composite, produced or provided, with the rotor blade element, the uncured layer 13 being located between the rotor blade element and the layer 12 of the laminate composite, and
curing the layer 13.

Preferred is a method of the invention wherein the preparing of the damaged rotor blade element comprises at least one of the following steps:
material-removing machining, especially grinding,
chemical surface treatment,
treatment with adhesion promoters (primers) and/or chemical strippers,
thermal surface treatment, especially plasma activation, plasma surface treatment, and gas flame treatment,
electrical surface treatment, especially corona treatment,
surface cleaning, preferably by brushing, sanding and/or blasting,
removal of residues of dust, grease and/or oil.

BRIEF DESCRIPTION OF THE SEVERAL VIEWS OF THE DRAWINGS

In the context of the present invention, preferably two or more of the aspects identified above as being preferred are realized simultaneously; especially preferred are the combinations of such aspects, and of the corresponding features, that emerge from the appended claims.

DETAILED DESCRIPTION

Figure 1:
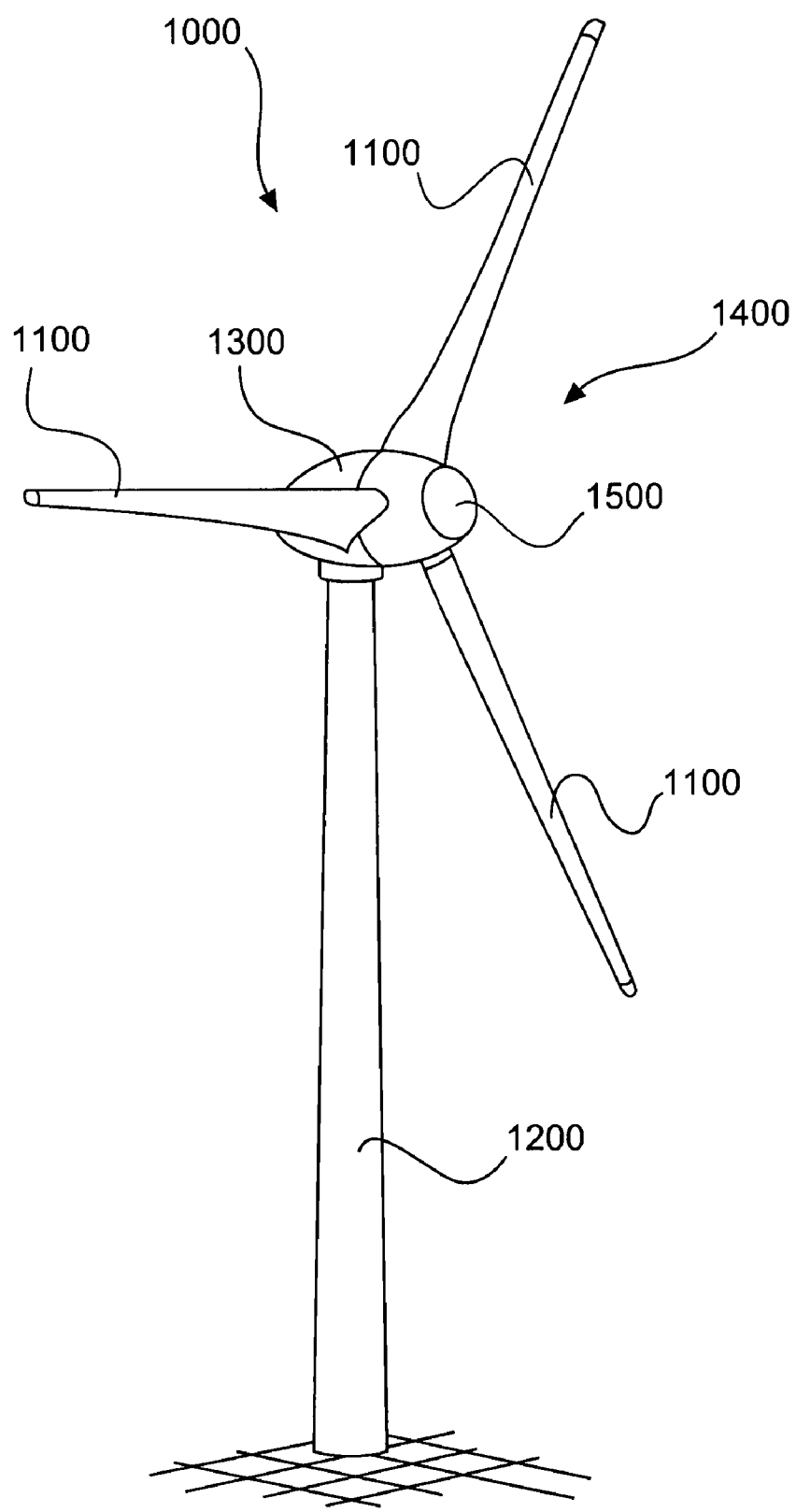
FIG. 1 shows a schematic representation of a wind power installation with rotor blade element according to the invention.

FIG. 1 shows a wind power installation 1000 with a tower 1200 and a nacelle 1300. Disposed on the nacelle 1300 is a rotor 1400 having three rotor blades 1100 and a spinner 1500. In operation, the wind places the rotor 1400 into a rotary movement and so drives a generator in the nacelle 1300. The rotor blades 1100 of the wind power installation 1000 possess a base (layer 13) comprising a plastic reinforced at least partly by fibers, and are coated in places with a surface foil (layer 11) of polyethylene, there being a polyurethane layer and/or elastomer layer (layer 12) located between the surface foil and the base. This construction is elucidated in more detail with the following figures.

Figure 2:
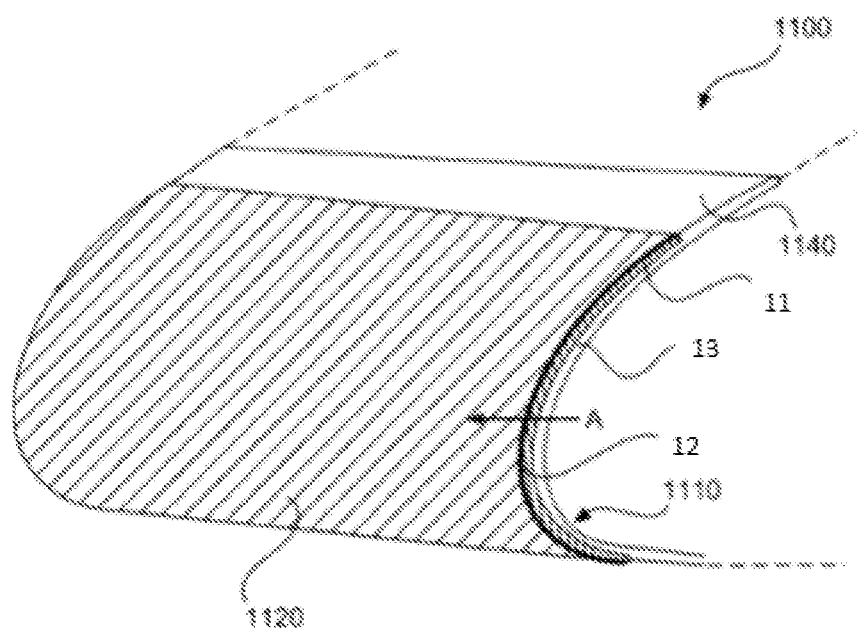
FIG. 2 shows schematically one embodiment of a rotor blade element according to the invention.

FIG. 2 shows a rotor blade element 1110 of the rotor blade 1100, namely the rotor blade nose. The rotor blade nose 1100 possesses a surface foil 11. In this exemplary embodiment, said foil consists of polyethylene of ultrahigh molecular weight (UHMW-PE). The surface foil 11 (layer 11) is joined via an attachment layer 12 (layer 12) to the base of the rotor blade element 13 (layer 13). The base 13 (layer 13) of the rotor blade element here consists at least partly of a plastic reinforced by fibers 14. In the exemplary embodiment, the fiber material is glass fiber reinforced plastic (GRP) and the curable resin is an epoxy resin. The attachment layer 12 (layer 12) consists at least partly of a polyurethane and/or an elastomer. Through the attachment of the surface foil 11 (layer 11) to the base 13 (layer 13) by means of an elastic attachment layer, it is possible to join UHMW-PE to epoxy resin. The surface foil 11 (layer 11) of UHMW-PE is particularly resistant toward abrasive loads of the kind which occur in the operation of wind power installations, particularly on the rotor edges.

Figure 3:
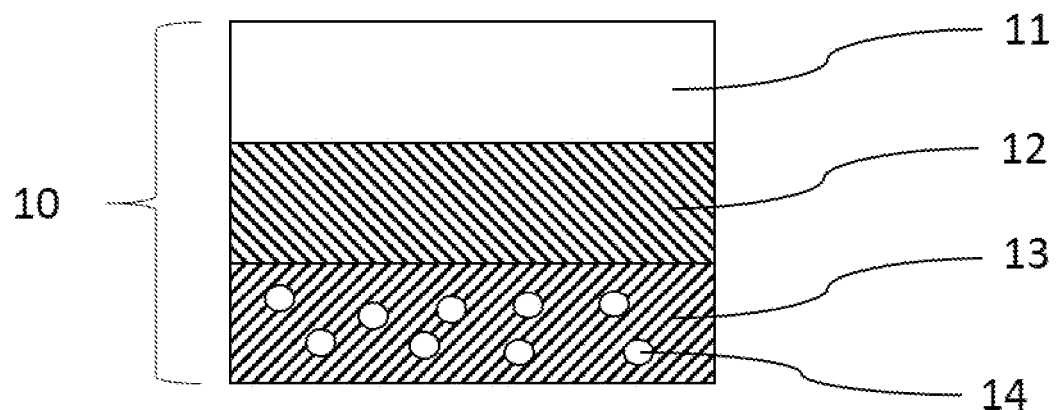
FIG. 3 shows in a schematic representation a detail of the rotor blade element from FIG. 2.

FIG. 3 shows a detail of a composite component 10 of the rotor blade element 1110. At this point on the rotor blade element 1110, the rotor blade element 1110 possesses the following layer construction: A first layer 11 which consists at least partly of polyethylene; a layer 12 which consists at least partly of a polyurethane and/or an elastomer; and at least one layer 13 as base, consisting at least partly of a plastic reinforced by fibers 14. In this exemplary embodiment, the fiber material is glass fiber reinforced plastic (GRP) and the curable resin is an epoxy resin, the polyethylene is a polyethylene of ultrahigh molecular weight (UHMW-PE), and the polyurethane is a thermoplastic polyurethane elastomer or the elastomer is an ethylene-propylene-diene rubber (EPDM).

Figure 4:
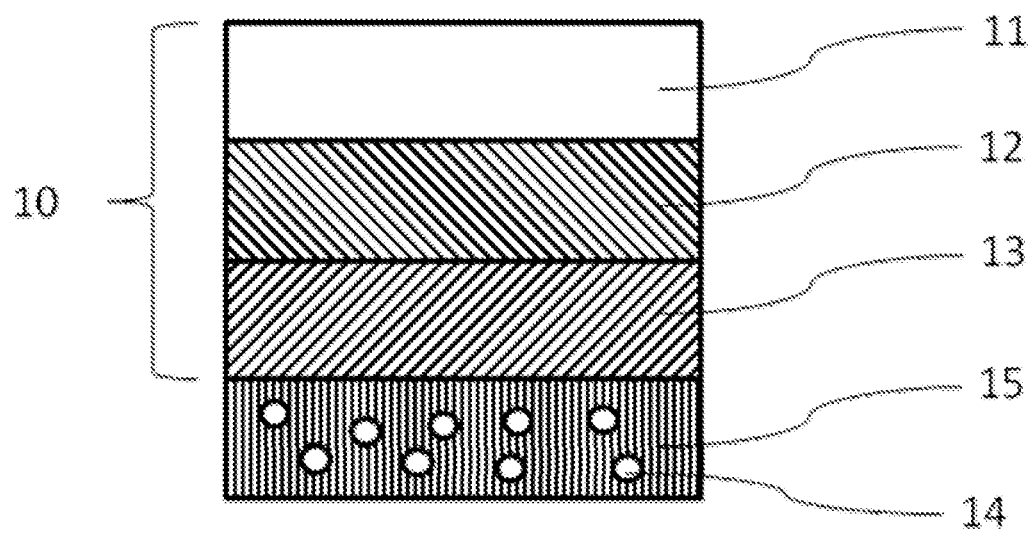
FIG. 4 shows in a schematic representation an alternative detail of the rotor blade element.

FIG. 4 shows an alternative detail of a composite component 10 of the rotor blade element 1110. At this point on the rotor blade element 1110, the rotor blade element 1110 possesses the following layer construction: A first layer 11 which consists at least partly of polyethylene; a layer 12 which consists at least partly of a polyurethane and/or an elastomer; at least one layer 13 which consists at least partly of an adhesive; and a layer 15 which consists at least partly of a plastic reinforced by fibers 14. In this exemplary embodiment, the fiber material is glass fiber reinforced plastic (GRP) and the curable resin is an epoxy resin, the polyethylene is a polyethylene of ultrahigh molecular weight (UHMW-PE), the polyurethane may be a thermoplastic polyurethane elastomer, a thermoplastic polyurethane or a polyurethane elastomer, or the elastomer is an ethylene-propylene-diene rubber (EPDM), and the adhesive is in each case an epoxy resin adhesive.

The invention claimed is:

1. A method comprising:
producing a composite component, comprising:
forming a laminate composite comprising a first layer coupled to a second layer, the first layer including polyethylene, the second layer including an elastomer, wherein the elastomer is an ethylene-propylene rubber, ethylene-propylene-diene rubber, ethylene-acrylate rubber, fluorocarbon rubber, acrylate rubber, or acrylonitrile-butadiene rubber, wherein forming the laminate comprises vulcanizing the elastomer of the second layer; and
after forming the laminate composite, coupling a third layer with the laminate composite, the third layer including a plastic reinforced by fibers or an adhesive, wherein the plastic is a plastic resin system based on at least one of: epoxide, poly(meth)acrylate matrix, polymethyl (meth)acrylate matrix, or poly(meth)acrylamide matrix, wherein the second layer is disposed directly between the first layer and the third layer, and wherein coupling the third layer with the laminate composite comprises joining the third layer with the laminate composite and curing the third layer.

2. The method according to claim 1, wherein coupling the third layer with the laminate composite comprises coupling the third layer directly with the second layer and curing the third layer.

3. The method according to claim 1, wherein the third layer includes the plastic reinforced by fibers.

4. The method according to claim 1, wherein the third layer includes the plastic reinforced by fibers, wherein the fibers are ultrahigh molecular weight polyethylene fibers.

5. The method according to claim 1, wherein the third layer includes the plastic reinforced by fibers, wherein the plastic reinforced by fibers is a carbon fiber reinforced plastic or a glass fiber reinforced plastic.

6. The method according to claim 1, wherein the polyethylene is one of: a high molecular weight polyethylene, an ultrahigh molecular weight polyethylene, or polytetrafluoroethylene.

7. The method as claimed in claim 1, wherein the third layer includes the adhesive, wherein the adhesive is an epoxy resin adhesive.

8. The method as claimed in claim 1, wherein the composite component is at least part of a wind turbine component.

9. The method as claimed in claim 8, wherein the wind turbine component is a wind turbine rotor blade.

10. The method as claimed in claim 9, further comprising securing the wind turbine rotor blade to a rotor of the wind turbine.

* * * * *